United States Patent
Kobayashi et al.

(10) Patent No.: US 7,724,283 B2
(45) Date of Patent: May 25, 2010

(54) ELECTRONIC CAMERA

(75) Inventors: Toshiaki Kobayashi, Nishishirakawa-gun (JP); Hitomi Shimoizumi, Yokohama (JP)

(73) Assignee: Nikon Corporation, Tokyo (JP)

( * ) Notice: Subject to any disclaimer, the term of this patent is extended or adjusted under 35 U.S.C. 154(b) by 1284 days.

(21) Appl. No.: 11/023,451

(22) Filed: Dec. 29, 2004

(65) Prior Publication Data

US 2005/0146619 A1 Jul. 7, 2005

(30) Foreign Application Priority Data

Jan. 6, 2004 (JP) .............. 2004-000880

(51) Int. Cl.
*H04N 5/228* (2006.01)

(52) U.S. Cl. ............ 348/208.1; 348/208.6; 348/208.12; 348/216.1; 348/220.1

(58) Field of Classification Search .............. 348/208.1, 348/208.6, 208.12, 16.1, 220.1; 396/52–55
See application file for complete search history.

(56) References Cited

U.S. PATENT DOCUMENTS 5,774,754 A * 6/1998 Ootsuka .............. 396/380
7,027,087 B2 4/2006 Nozaki et al.
2004/0126097 A1 * 7/2004 Aridome .............. 386/98

FOREIGN PATENT DOCUMENTS

| JP | A 5-150308 | 6/1993 |
| JP | A-11-136557 | 5/1999 |
| JP | A-2000-165704 | 6/2000 |
| JP | A 2000-209484 | 7/2000 |
| JP | A 2002-287195 | 10/2002 |

* cited by examiner

*Primary Examiner*—Yogesh K Aggarwal
(74) *Attorney, Agent, or Firm*—Oliff & Berridge, PLC

(57) ABSTRACT

An electronic camera includes: an image capturing unit that captures a subject image; an image compression unit that executes a specific type of compression processing on image data obtained by the image capturing unit; and a decision-making unit that makes a decision as to whether or not a camera-shake has occurred based upon first compressed image data resulting from the compression processing executed by the image compression unit on first image data obtained by capturing an image following a photographing instruction and second compressed image data resulting from the compression processing executed by the image compression unit on second image data captured prior to the photographing instruction.

11 Claims, 3 Drawing Sheets

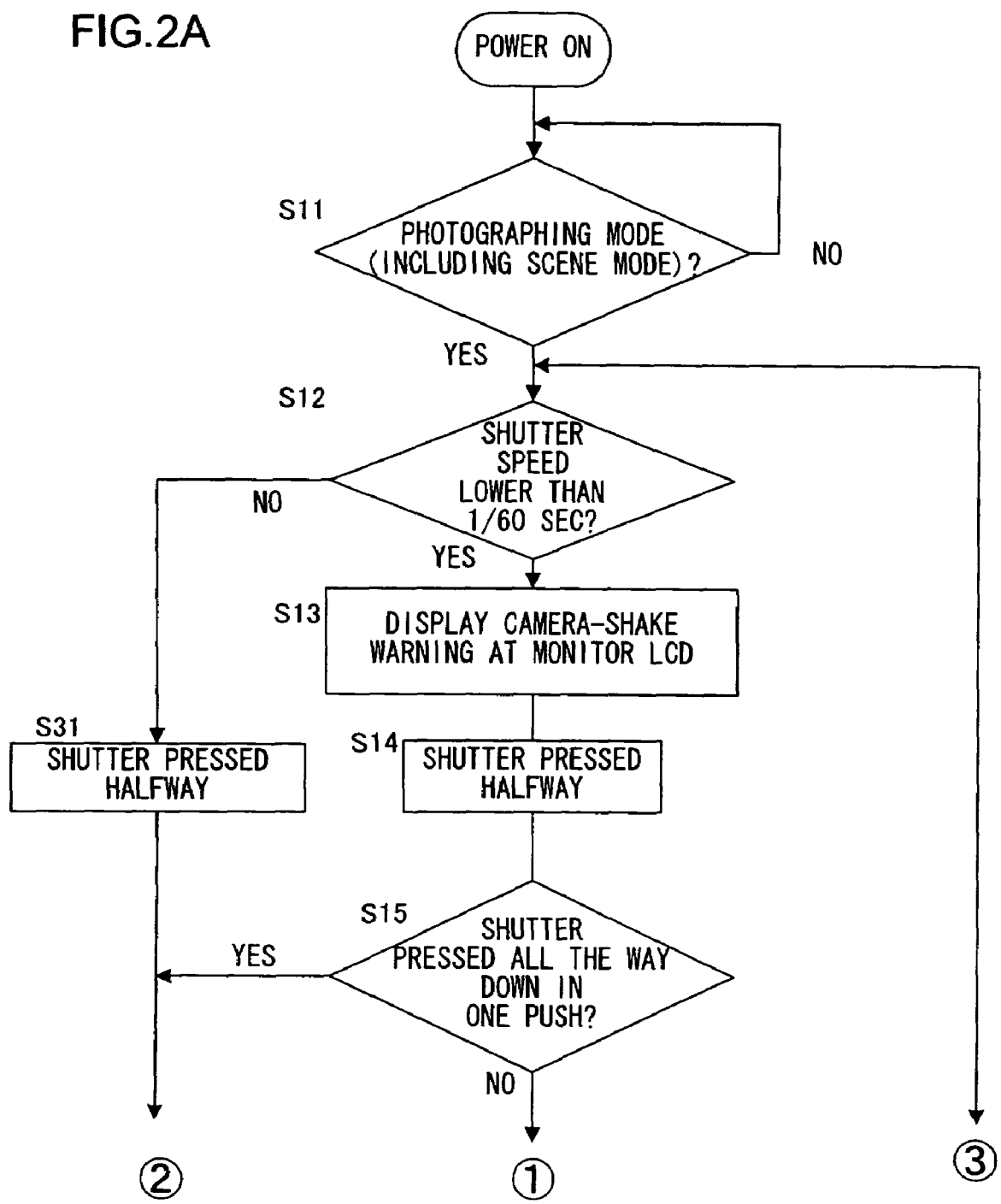

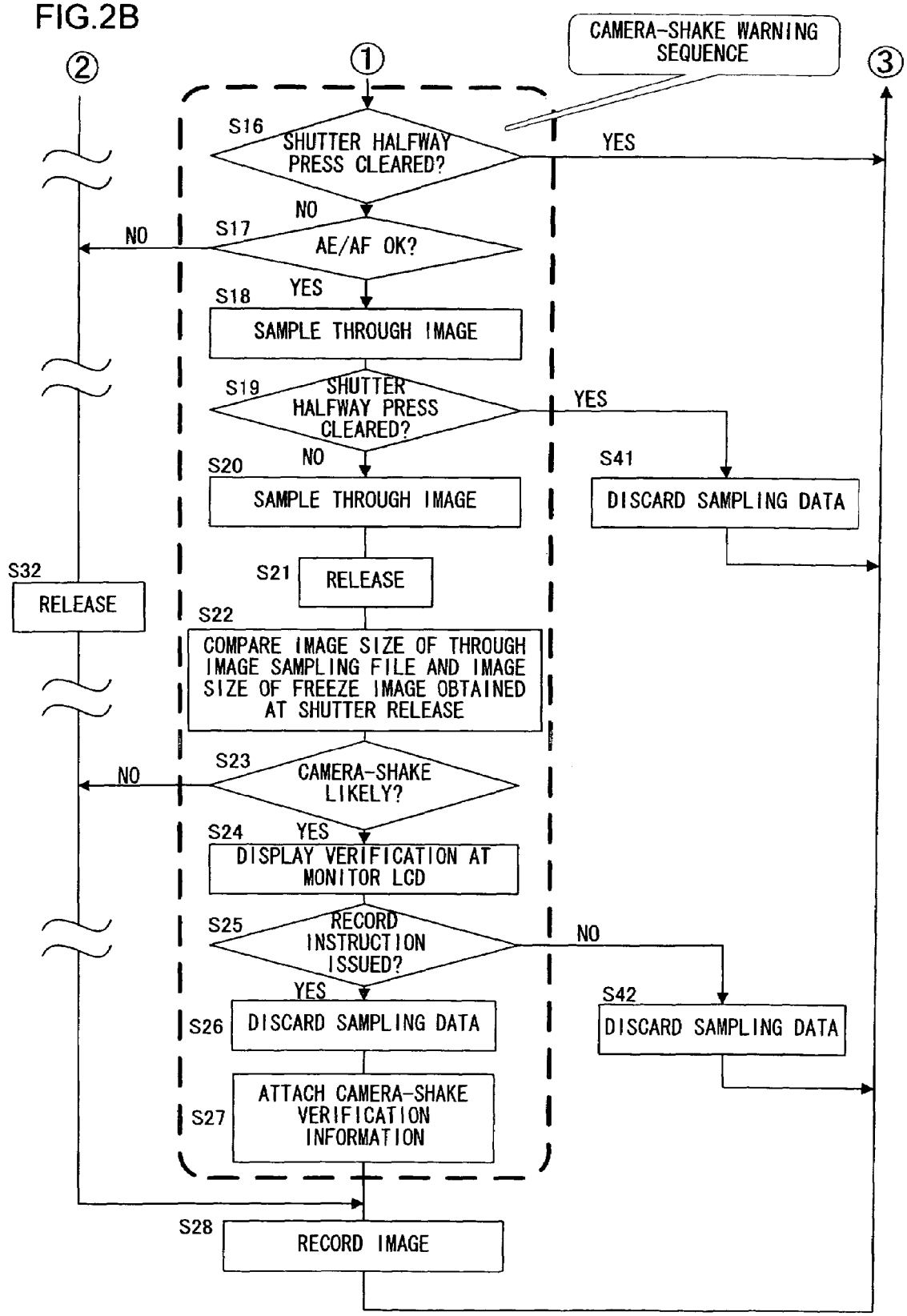

ELECTRONIC CAMERA

INCORPORATION BY REFERENCE

The disclosure of the following priority application is herein incorporated by reference:

Japanese Patent Application No. 2004-000880 filed Jan. 6, 2004.

BACKGROUND OF THE INVENTION

1. Field of the Invention

The present invention relates to a camera that detects the occurrence of camera-shake.

2. Description of the Related Art

There is a camera known in the related art that detects camera-shake during a photographing operation and displays a warning (see Japanese Laid Open Patent Publication No. H5-150308). In the camera disclosed in Japanese Laid Open Patent Publication No. H5-150308, a subject image for autofocusing is obtained before and after the film is exposed and a camera-shake is determined to have occurred if the degree to which the two images are offset from each other exceeds an allowable extent. The image obtained prior to the film exposure is a focused image, whereas the post film exposure image is an image taken immediately after the shutter closes.

SUMMARY OF THE INVENTION

However, a camera-shake cannot be detected accurately by using subject images for autofocusing that do not provide as much information as an image that is actually photographed.

According to the 1st aspect of the invention, an electronic camera, comprises: an image capturing unit that captures a subject image; an image compression unit that executes a specific type of compression processing on image data obtained by the image capturing unit; and a decision-making unit that makes a decision as to whether or not a camera-shake has occurred based upon first compressed image data resulting from the compression processing executed by the image compression unit on first image data obtained by capturing an image following a photographing instruction and second compressed image data resulting from the compression processing executed by the image compression unit on second image data captured prior to the photographing instruction.

According to the 2nd aspect of the invention, it is preferred that the electronic camera according to the 1st aspect further comprises a warning unit that issues a warning if the decision-making unit determines that a camera-shake has occurred.

According to the 3rd aspect of the invention, in the electronic camera according to the 1st aspect, it is preferred that the first image data has a data size larger than a data size of the second image data.

According to the 4th aspect of the invention, in the electronic camera according to the 2nd aspect, it is preferred that: there is further provided an image interpolation unit that executes interpolation processing on the second image data so as to substantially match a data size of the second image data with a data size of the first image data; the second compressed image data are obtained by compressing the image data having undergone the interpolation processing; and the decision-making unit determines that a camera-shake has occurred if a data size (d) of the first compressed image data is substantially smaller than a data size (b) of the second compressed image data.

According to the 5th aspect of the invention, in the electronic camera according to the 2nd aspect, it is preferred that the decision-making unit determines that a camera-shake has occurred if a ratio (d/c) of a data size (d) of the first compressed image data and a target data size (c) for the compression processing on the first image data is substantially smaller than a ratio (b/a) of a data size (b) of the second compressed image data and a target data size (a) for the compression processing on the second image data.

According to the 6th aspect of the invention, in the electronic camera according to the 1st aspect, it is preferred that the decision-making unit makes a decision as to whether or not a camera-shake has occurred if a shutter speed set for a photographing operation is lower than a predetermined speed.

According to the 7th aspect of the invention, in the electronic camera according to the 2nd aspect, it is preferred that: there is further provided a recording control unit that records the first compressed image data into a recording medium; the warning unit issues a warning before the recording control unit records the first compressed image data into the recording medium; and if a warning has been issued by the warning unit, the recording control unit records the first compressed image data into the recording medium in response to a record instruction issued following the warning.

According to the 8th aspect of the invention, in the electronic camera according to the 7th aspect, it is preferred that: when recording the first compressed image data in response to the record instruction issued following the warning, the recording control unit records a camera-shake flag into the recording medium in correspondence to the first compressed image data; and the electronic camera further comprises a reproduction control unit that indicates a presence of the camera-shake flag recorded in correspondence to the first compressed image data when reproducing an image by using the first compressed image data recorded in the recording medium.

According to the 9th aspect of the invention, in the electronic camera according to the 1st aspect, it is preferred that: there is further provided a recording control unit that records the first compressed image data into a recording medium; and when the decision-making unit determines that a camera-shake has occurred while obtaining the first image data, the recording control unit records information indicating the occurrence of camera-shake into the recording medium in correspondence to the first compressed image data.

According to the 10th aspect of the invention, in the electronic camera according to the 1st aspect, it is preferred that the first image data are photographic image data to be recorded and stored in a recording medium.

According to the 11th aspect of the invention, in the electronic camera according to the 10th aspect, it is preferred that the second image data are image data of a through image captured immediately before the first image data are captured.

According to the 12th aspect of the invention, in the electronic camera according to the 4th aspect, it is preferred that: a correction coefficient (k) is obtained in advance to match a data size of the second image data with a data size of the first image data; and the decision-making unit determines that a camera-shake has occurred if a data size (d) of the first compressed image data is smaller than a data size (b×k) of the second compressed image data (b) multiplied by the correction coefficient (k).

BRIEF DESCRIPTION OF THE DRAWINGS

FIG. 2A presents a flowchart 1 of the camera processing executed in the arithmetic operation circuit; and FIG. 2B presents a flowchart 2 of the camera processing executed in the arithmetic operation circuit.

DESCRIPTION OF THE PREFERRED EMBODIMENT

Figure 1:
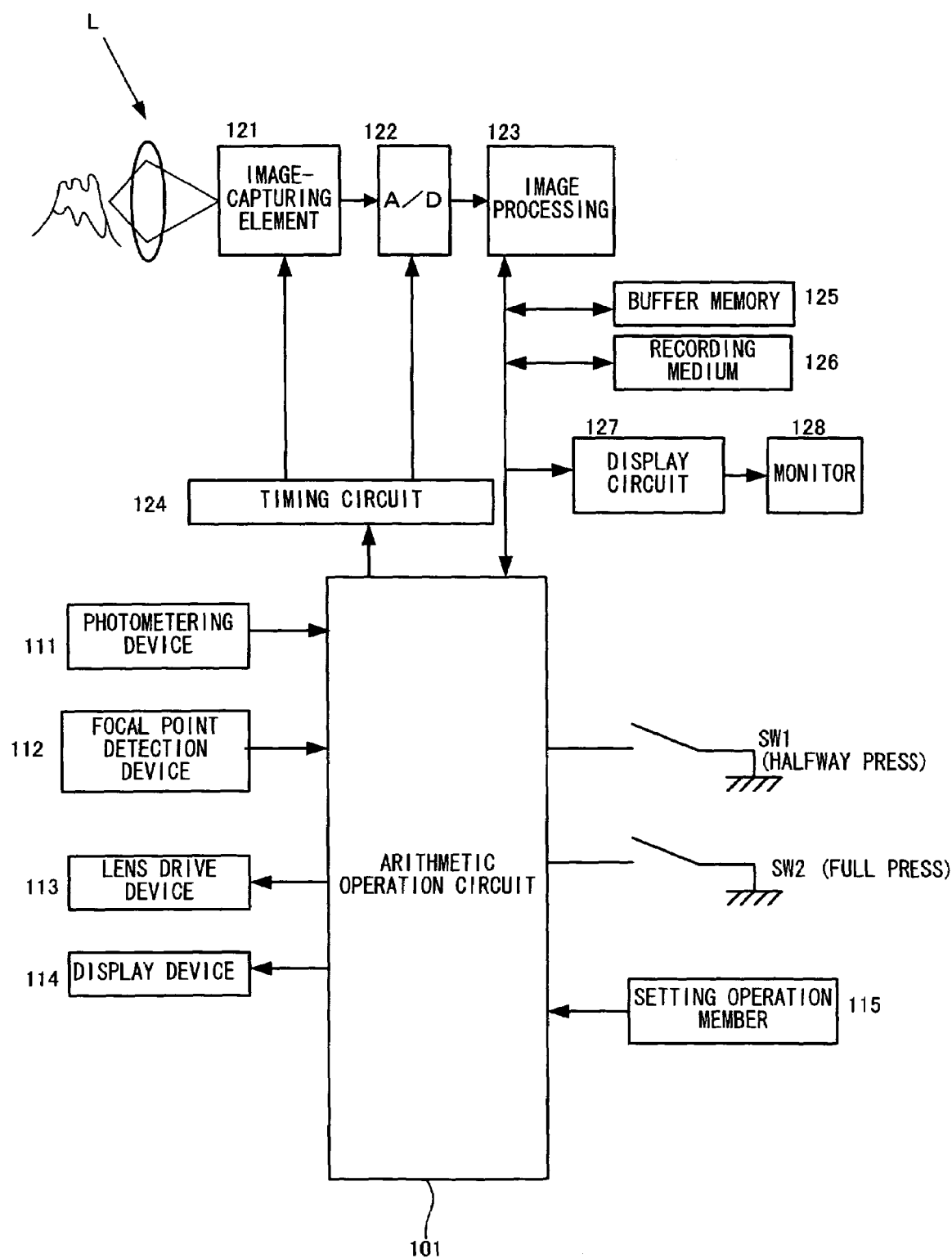
FIG. 1 is a block diagram of the essential structure adopted in the electronic camera achieved in an embodiment of the present invention.

The following is an explanation of a preferred embodiment of the present invention, given in reference to the drawings. FIG. 1 is a block diagram of the essential structure adopted in the electronic camera achieved in the embodiment of the present invention. An arithmetic operation circuit 101 in FIG. 1 is constituted with a microcomputer and peripheral circuits. The arithmetic operation circuit 101 executes specific arithmetic operations by using signals input thereto from various blocks to be detailed later and outputs control signals generated based upon the arithmetic operation results to the individual blocks.

An image-capturing element 121 is constituted with a CCD image sensor or the like. The image-capturing element 121 captures an image formed with subject light having passed through a photographic lens L and outputs image capturing signals to an A/D conversion circuit 122. The A/D conversion circuit 122 converts the analog image capturing signals to digital signals. The image-capturing element 121 and the A/D conversion circuit 122 are driven with specific operational timing by drive signals output from a timing circuit 124.

An image processing circuit 123 is constituted with an ASIC or the like. The image processing circuit 123 executes image processing such as white balance processing on the image data resulting from the digitization. In addition, it executes compression processing through which the image data having undergone the image processing are compressed in a specific format, decompression processing through which the compressed image data are decompressed and the like. Image data to be processed at the image processing circuit 123 are temporarily stored in a buffer memory 125. A recording medium 126 is constituted with a memory card that can be detachably loaded in the camera or the like. The image data having undergone the image processing are recorded into the recording medium 126.

At a display circuit 127 constituted with a frame memory or the like, image data to be displayed at a display monitor 128 are stored. The display image data are generated by using uncompressed image data (image data that have not undergone the compression processing or decompressed image data). At the display monitor 128, which may be constituted with, for instance, a liquid crystal display monitor, an image reproduced by using the image data stored in the display circuit 127 is displayed.

A photo-metering device 111 detects the quantity of the subject light and outputs a detection signal to the arithmetic operation circuit 101. The arithmetic operation circuit 101 calculates the brightness of the subject based upon the detection signal. The arithmetic operation circuit 101 executes a specific exposure calculation based upon the subject brightness having been calculated and the image capturing sensitivity setting.

A focal point detection device 112 detects the state of the focal point position adjustment achieved through the photographic lens L and outputs a detection signal to the arithmetic operation circuit 101. A lens drive device 113 drives a focus lens (not shown) in the photographic lens L forward/backward along the optical axis in response to a command issued by the arithmetic operation circuit 101 so as to adjust the focal point position of the photographic lens L.

A display device 114 displays photographic information such as the shutter speed and the aperture value in response to a command issued by the arithmetic operation circuit.

A halfway press switch SW1 enters an on/off state by interlocking with the depression of a shutter release operation button (not shown). The halfway press switch SW1 enters an on state as the shutter release operation button is depressed further down from a halfway press operation position, and is in an off state when the shutter release operation button is not depressed as far down as the halfway press operation position.

A full press switch SW2 enters an on/off state by interlocking with the depression of the shutter release operation button (not shown). As the shutter release operation button is depressed all the way down to a full press operation position from the halfway press operation position, the full press switch SW2 enters an on state, whereas it is in an off state when the shutter release operation button is not depressed as far down as the full press operation position.

On/off signals from the halfway press switch SW1 and the full press switch SW2 are individually input to the arithmetic operation circuit 101 as shutter release operation signals.

A setting operation member 115 includes a mode selector switch (not shown) and outputs operation signals corresponding to setting operations to the arithmetic operation circuit 101. Based upon the operation signals input thereto, the arithmetic operation circuit 101 executes setting change processing. The mode selector switch outputs an operation signal used to switch the electronic camera to one of a photographing mode, a reproduction mode and a setup mode. The photographing mode is an operation mode in which a picture is taken in response to a full press operation, the reproduction mode is an operation mode in which an image reproduced by using image data recorded in the recording medium 126 is displayed at the display monitor 128, and the setup mode is an operation mode in which a menu operation or the like is performed.

The present invention is characterized in that a camera-shake occurring while taking a photograph with the electronic camera is detected and the photographer is alerted. The camera-shake is small movements or vibration of the camera due to hand movements when the shutter is released and the camera-shake may cause an image to be blurred. The detection of the camera-shake may be referred to as the detection of blurring of image due to camera-shake. The following explanation focuses on the operation executed in the electronic camera set in the photographing mode to take a photograph, and the reproduction mode and the setup mode are not explained.

The flow of the camera processing executed in the arithmetic operation circuit 101 of the electronic camera is now explained in reference to the flowchart presented in FIGS. 2A and 2B. The program in conformance to which the processing in FIGS. 2A and 2B is executed is started up as the main switch (not shown) of the camera is turned on.

In step S11 in FIG. 2A, the arithmetic operation circuit 101 makes a decision as to whether or not the electronic camera is currently set in the photographing mode. The arithmetic operation circuit 101 makes an affirmative decision in step S11 if the camera is set in the photographing mode to proceed to step S12, whereas it makes a negative decision in step S11 if the electronic camera is not currently set in the photographing mode, to repeatedly execute the decision-making processing described above. A scene mode may be selected in the electronic camera set in the photographing mode. In the scene mode, the camera automatically selects settings for the exposure, the white balance processing and the like in correspondence to a specific photographic scene.

In step S12, the arithmetic operation circuit 101 makes a decision as to whether or not the shutter speed is lower than 1/60 sec. The arithmetic operation circuit 101 makes an affirmative decision in step S12 if the shutter speed is lower than 1/60 sec to proceed to step S13, whereas it makes a negative decision in step S12 if the shutter speed is equal to or higher than 1/60 sec to proceed to step S31. In the latter case, the operation proceeds to step S31 to execute normal photographic sequence processing.

In step S13, the arithmetic operation circuit 101 brings up a camera-shake warning at the display monitor 128. This warning is provided to the photographer as an advance warning, i.e., that there is a likelihood of a camera-shake occurring during the photographing operation, in the form of, for instance, an icon of a hand. Once the arithmetic operation circuit 101 outputs the icon display data to the display circuit 127, the operation proceeds to step S14.

After receiving an on signal input from the halfway press switch SW1 (the shutter button pressed halfway down) in step S14, the arithmetic operation circuit 101 proceeds to step S15. In step S15, the arithmetic operation circuit 101 makes a decision as to whether or not the shutter button has been pressed all the way down in a single push. The arithmetic operation circuit 101 makes an affirmative decision in step S15 if an on signal is input from the full press switch SW2 immediately following the halfway depression of the shutter button to proceed to step S32 in FIG. 2B. The operation proceeds to step S32 to execute the normal photographic sequence processing instead of a "warning sequence" executed to alert the photographer to a camera-shake. The arithmetic operation circuit 101 makes a negative decision in step S15 if an off signal is input from the full press switch SW2 to proceed to step S16 in FIG. 2B.

The processing in step S16 and subsequent steps constitutes the "camera-shake warning sequence" processing. In step S16, the arithmetic operation circuit 101 makes a decision as to whether or not the shutter halfway press operation has been cleared. The arithmetic operation circuit 101 makes an affirmative decision in step S16 if an off signal is input from the halfway press switch SW1 to return to step S12 in FIG. 2A to exit the "camera-shake warning sequence" processing. The arithmetic operation circuit 101 makes a negative decision in step S16 if an on signal is input from the halfway press switch SW1 to proceed to step S17.

In step S17, the arithmetic operation circuit 101 makes a decision as to whether or not AE/AF processing has been completed successfully. The arithmetic operation circuit 101 makes an affirmative decision in step S17 if the exposure calculation processing and the focal point detection processing have been completed in a normal manner to proceed to step S18, whereas it makes a negative decision in step S17 if specific exposure cannot be achieved based upon the exposure calculation results or if a focus match is not achieved through the AF processing to proceed to step S32. The operation proceeds to step S18 if a focus match is achieved on the main subject with a clear, well-defined image of the main subject formed on the image-capturing element 121. The operation proceeds to step S32 assuming that information necessary to execute comparison processing (camera-shake decision-making) to be detailed later has not been obtained due to a failure to achieve a focus match or insufficient exposure, and in this case, the operation exits the "camera-shake warning sequence" processing and executes the normal photographic sequence processing.

In step S18, the arithmetic operation circuit 101 issues an instruction for through image sampling and then the operation proceeds to step S19. In response, the newest image data corresponding to the monitoring subject image (through image) used for a dynamic display at the display monitor 128 are recorded in the buffer memory 125. In the explanation, the recording of the image data into the buffer memory 125 is referred to as sampling. It is to be noted that the electronic camera assumes a structure that allows the image captured by the image-capturing element 121 to be dynamically displayed at the display monitor 128 as the through image when it is set in the photographing mode, regardless of whether or not a halfway press operation or a full press operation is performed. The through image has a data size corresponding to the display resolution at the display monitor 128.

In step S19, the arithmetic operation circuit 101 makes a decision as to whether or not the shutter halfway press operation has been cleared. The arithmetic operation circuit 101 makes an affirmative decision in step S19 if an off signal is input from the halfway press switch SW1 to proceed to step S41 to exit the "camera-shake warning sequence" processing. The arithmetic operation circuit 101 makes a negative decision in step S19 if an on signal is input from the halfway press switch SW1 to proceed to step S20.

In step S41, the arithmetic operation circuit 101 discards (erases) the through sampling image having been recorded in the buffer memory 125 and then the operation returns to step S12 in FIG. 2A.

In step S20, the arithmetic operation circuit 101 issues an instruction for through image sampling before proceeding to step S21. In response, the through sampling image having been recorded in the buffer memory 125 is updated with the most recent through image.

As an on signal (release) is input from the full press switch SW2 in step S21, the arithmetic operation circuit 101 issues a command for recording the photographic image data to be recorded which are captured following the shutter release into an area in the buffer memory 25 other than the through image data recording area before the operation proceeds to step S22. The photographic image data have a data size larger than that of the through image data. The photographic image data are photographic image viewing data which are recorded and saved in the recording medium.

In step S22, the arithmetic operation circuit 101 compares the data file of the through image recorded in the buffer memory 125 with the data file of the photographic image (freeze image) and then the operation proceeds to step S23.

The comparison processing is executed as explained below. The arithmetic operation 101 executes image compression processing individually on the through image and the photographic image by using a compression parameter that will achieve a predetermined compression rate (e.g., 1/10). With this compression parameter, the code volume (i.e., the data size) of average image data is reduced to 1/10 of the initial code volume after the compression processing, but it does not compress all image data to image data with the data size exactly 1/10 of the initial data size. For instance, a focus-matched image with the focus set on the main subject contains a great deal of high frequency component and thus, the code volume after the compression processing is greater than the target code volume (e.g., 1/10). In contrast, in the case of an unfocused image, the high frequency component contained therein is not as significant and, for this reason, the code volume after the compression processing is smaller than the target code volume. In other words, the code volume after the compression processing is determined by the condition of the uncompressed image.

The arithmetic operation circuit 101 compares the ratio (d/c) of the code volume (d) of the compressed photographic image and the target code volume (c) for the compression processing on the photographic image with the ratio (b/a) of the code volume (b) of the compressed through image and the target code volume (a) for the compression processing on the through image. It is to be noted that the target code volume (c) is 1/10 of the code volume (X) of the uncompressed photographic image (i.e., X/10), and the target code volume (a) is 1/10 of the code volume (Y) of the uncompressed through image (i.e., Y/10).

If the ratio (d/c) is judged to be smaller than the ratio (b/a) in step S23 in FIG. 2B, the arithmetic operation circuit 101 makes an affirmative decision in step S23 assuming that a camera-shake is likely to have occurred during the photographing operation and proceeds to step S24. If, on the other hand, the ratio (d/c) is greater than or equal to the ratio (b/a), the arithmetic operation circuit 101 makes a negative decision in step S23 assuming that a camera-shake is unlikely to have occurred during the photographing operation to proceed to step S28. The operation proceeds to step S28 to exit the "camera-shake warning sequence" processing and execute the normal photographic sequence processing.

In step S24, the arithmetic operation circuit 101 brings up a camera-shake warning at the display monitor 128. The warning displayed at this time informs the photographer that a camera-shake is likely to have occurred during the photographing operation in, for instance, a message "Camera-shake likely to have occurred. Record?" Once the message data have been output to the display circuit 127, the arithmetic operation circuit 101 proceeds to step S25.

In step S25, the arithmetic operation circuit 101 makes a decision as to whether or not a record instruction has been issued. If an operation signal indicating a record instruction is input from the setting operation member 115, the arithmetic operation circuit 101 makes an affirmative decision in step S25 to proceed to step S26. If an operation signal indicating a recording rejection is input from the setting operation member 115, the arithmetic operation circuit 101 makes a negative decision in step S25 and proceeds to step S42 to exit the "camera-shake warning sequence" processing.

In step S42, the arithmetic operation circuit 101 discards (erases) the through sampling image having been recorded in the buffer memory 125 and then the operation returns to step S12 in FIG. 2A.

In step S26, the arithmetic operation circuit 101 discards (erases) the through sampling image having been recorded in the buffer memory 125 and then the operation proceeds to step S27.

In step S27, the arithmetic operation circuit 101 adds camera-shake verification information (a camera-shake flag) to the data of the photographic image and then proceeds to step S28 to exit the "camera-shake warning sequence" processing.

In step S28, the arithmetic operation circuit 101 records the photographic image data into the recording medium 126 and then returns to step S12. If the camera-shake flag is included in the photographic image data, the arithmetic operation circuit 101 records the flag into, for instance, a header portion of the data file in which the photographic image data are to be recorded. As a result, the information indicating that a camera-shake is likely to have occurred while capturing the image data in the data file is recorded into the recording medium 126. In other words, the information indicating that the image data in the data file may have been blurred due to the camera-shake is recorded into the recording medium 126.

The processing executed in step S31 in FIG. 2A and subsequent steps is the normal photographic sequence processing. As an on signal is input from the halfway press switch SW1 in step S31 (the shutter button is pressed halfway down), the arithmetic operation circuit 101 issues an instruction for AE/AF processing, and the operation proceeds to step S32 in FIG. 2B upon completing the exposure calculation processing and the focal point detection processing in a normal manner.

As an on signal (release) is input from the full press switch SW2 in step S32, the arithmetic operation circuit 101 issues a command for recording the photographic image data to be recorded which are captured after the shutter release into the buffer memory 125 and then proceeds to step S28.

When an image constituted of photographic image data recorded in the recording medium 126 is reproduced and displayed at the display monitor 128 in the electronic camera set in the reproduction mode, the arithmetic operation circuit 101 superimposes a camera-shake icon over the reproduced image on display if the camera-shake flag is recorded in the header of the photographic image data file.

In addition, when a list of photographic image data files recorded in the recording medium 126 is displayed at the display monitor 128, the arithmetic operation circuit 101 displays a camera-shake icon attached to the name (the file number) of any photographic image data file having the camera-shake flag recorded in the header thereof.

The embodiment described above is now summarized.

(1) The image obtained at the image-capturing element 121 following a full press operation (shutter release) is compared with the image obtained at the image-capturing element 121 prior to the full press operation (shutter release) during the comparison processing executed for purposes of camera-shake decision-making, and thus, the camera-shake decision-making can be executed with a higher degree of accuracy by using a greater volume of image information compared to the volume of information available in the related art in which the comparison processing is executed based upon the AF image information.

(2) One of the images used in the comparison processing is an image obtained prior to the full press operation and, for this reason, it is not necessary to photograph a plurality of images following the full press operation (shutter release), unlike in the so-called best shot selector technology (the image selection technology adopted in the camera disclosed in Japanese Laid Open Patent Publication No. 2000-209484). As a result, the length of time elapsing before the comparison results are obtained following the shutter release is reduced.

(3) The image prior to the full press operation (shutter release) used in the comparison processing is a through image obtained immediately after a focus match is achieved. This means that the through image available at all times for the dynamic display at the display monitor 128 can be utilized for the comparison processing. Thus, no special image needs to be obtained to be used in the comparison processing to improve the camera response. In addition, since the through image obtained after a focus match and containing more high frequency component is used in the comparison processing, the comparison of the code volumes is facilitated.

(4) Since the ratio of the code volume of the compressed image (photographic image) obtained after the full press operation (shutter release) and the target code volume for compressing the photographic image is compared with the ratio of the code volume of the compressed through image obtained prior to the full press operation (shutter release) and the target code volume for the compression of the through image, it is not necessary to execute interpolation processing or the like on the image (the through image in the example described above) with the smaller data size in order to adjust the data sizes even when the image data sizes of the photographic image and the through image are different from each other.

(5) The use of the ratio (d/c) of the code volume (d) of the compressed photographic image and the target code volume (c) for the compression processing on the photographic image, and the ratio (b/a) of the code volume (b) of the compressed through image and the target code volume (a) for the compression processing on the through image in the comparison processing enables camera-shake decision-making that is executed by taking into consideration factors attributed to the difference between the data size of the photographic image and the data size of the through image.

(6) If the desired exposure is not achieved based upon the results of the exposure calculation or a focus match is not achieved through the AF processing (if a negative decision is made in step S17), the operation exits the "camera-shake warning sequence" processing and thus, no inaccurate decision is made.

(7) When it is judged that a camera-shake is likely to have occurred, the warning is displayed (step S24) before the image data are recorded into the recording medium 126. As a result, no photographic image that the photographer does not wish to record is recorded into the recording medium 126 by mistake, to prevent wasteful consumption of the recording capacity at the recording medium 126.

(8) Since the camera-shake flag is recorded in correspondence to any photographic image recorded into the recording medium 126 in response to a record instruction issued by the photographer (in response to an affirmative decision made in step S25) after the camera-shake warning is brought up on display, information indicating that a camera-shake is likely to have occurred while photographing the image is retained together with the corresponding photographic image data. Thus, the camera-shake icon can be superimposed when the reproduced image is displayed by using the photographic image data, and the camera-shake icon can be attached to the file name of the photographic image data file when displaying the list of recorded image data files. The camera-shake icon attached to the image data file name in the file list helps the photographer decide which file to erase first when the available storage capacity in the recording medium 126 becomes low.

While an explanation is given above on an example in which the target code volumes for the image compression processing executed on the through image and the photographic image for purposes of comparison are $1/10$ of the code volumes before the image compression, the target code volumes may be, for instance, $1/4$ of the initial code volumes instead of $1/10$.

The target code volumes for the image compression processing executed on the through image and the photographic image for purposes of comparison may be predetermined code volumes, each corresponding to a specific level of recording image quality set in the electronic camera. When the electronic camera is set so as to record the photographic image data after executing image compression processing on them, the electronic camera executes image compression processing in correspondence to the recording image quality, separately from the "camera-shake warning sequence" processing. For this image compression processing, the target code volume is set to a large value to achieve a high level of recording image quality and the target code volume is set to a small value to record an image with low recording image quality. By matching the target code volumes in the image compression processing executed for purposes of comparison as part of the "camera-shake warning sequence" processing with the target code volumes corresponding to the levels of recording image quality, the compressed image data obtained through the compression processing executed with the target code volume set in correspondence to the levels of recording image quality can also be used in the "camera-shake warning sequence" processing and, as a result, the length of time required for the processing can be reduced compared to the length of time required to compress each image twice at different target code volumes.

While an explanation is given above on an example in which the data size of the photographic image data is greater than the data size of the through image data, the data sizes of the photographic image data and the through image data may be equal to each other.

When the data size of the photographic image data is greater than the data size of the through image data, interpolation processing may be executed on the image with the smaller data size (the through image in the example explained above) so as to match its data size with the data size of the photographic image data during the comparison processing executed for camera-shake decision-making. In such a case, the comparison processing should be executed as described below after an interpolated image is obtained through interpolation processing of the known art executed for artificially increasing the data size of the through image to a data size matching that of the photographic image.

The arithmetic operation circuit 101 compares the code volume (d) of the compressed photographic image with the product (b2×k2) obtained by multiplying the code volume (b2) of the compressed interpolated image by a predetermined coefficient (k2). The arithmetic operation circuit 101 assumes that a camera-shake is likely to have occurred during the photographing operation if the code volume (d) is less than the product (b2×k2), whereas it assumes that a camera-shake is unlikely to have occurred during the photographing operation if the code volume (d) is greater than or equal to the product (b2×k2).

The interpolation processing is executed on the through image in order to adjust its data size to the data size of the photographic image data, as described above. However, the data sizes still do not always achieve an exact match. The predetermined coefficient (k2) is a correction coefficient used to match as closely as possible the code volume (d) of the compressed photographic image obtained in the electronic camera handled without no camera-shake with the code volume (b2) of the interpolated through image after the image compression. The predetermined coefficient (k2) has been obtained in advance in photography without camera-shake.

While the through sampling image recorded in the buffer memory 125 is discarded (erased) (step S41, S42 or S26) in the explanation provided above, the through sampling image does not need to be erased each time if sufficient storage capacity is available in the buffer memory 125.

While the operation proceeds to execute the camera-shake warning sequence if the shutter speed is judged to be lower than $1/60$ sec, the decision-making threshold value for the shutter speed does not need to be $1/60$ sec and may be, for instance, $1/30$ sec.

The photographer may be allowed to decide whether or not to execute the camera-shake warning sequence processing through menu setting or the like, as well. In such a case, the camera-shake warning sequence processing is executed only if a setting for executing the camera-shake warning sequence processing is selected.

While the camera-shake warning is displayed at the display monitor 128, it may be displayed at the display device 114 instead, or the camera-shake may be indicated with an LED or the like. Alternatively, a warning may be issued as an audio message.

While a single through image that has been most recently captured is retained in the electronic camera described above, a plurality of through images may be retained and then one through image among them may be selected. For instance, a plurality of through images may be sequentially sampled and saved when there is no change in the photographic scene and then a single through image may be selected from a plurality of saved through images. The through image that achieves the largest data size after the compression processing should be selected. In this case, no problem arises even if a camera-shake occurs while capturing through images. It is to be noted that a decision as to whether or not a change has occurred in the photographic scene should be made as described below. Namely, based upon signals output from the photometering device 111, brightness information is obtained through calculation in correspondence to each of a plurality of areas in the photographic image plane and the brightness information thus obtained is checked for any change in the brightness level. The arithmetic operation circuit 101 compares the most recently obtained brightness information with the previous brightness information, and judges that a change in the brightness has occurred if a difference exceeding a predetermined brightness decision-making threshold value manifests in at least one of the plurality of areas.

The above described embodiment is an example, and various modifications can be made without departing from the spirit and scope of the invention.

What is claimed is:

1. An electronic camera, comprising:
    an image capturing unit that captures a subject image;
    an image compression unit that executes a specific type of compression processing on image data obtained by the image capturing unit; and
    a decision-making unit that makes a decision as to whether or not a camera-shake has occurred if a ratio (d/c) of a data size (d) of a first compressed image data, resulting from the compression processing executed by the image compression unit on first image data obtained by capturing an image following a photographing instruction, and a target data size (c) for the compression processing is substantially smaller than a ratio (b/a) of a data size (b) of a second compressed image data, resulting from the compression processing executed by the image compression unit on second image data captured prior to the photographing instruction, and a target data size (a) for the compression processing on the second image data, wherein:
    the target data size (c) is a compression target data amount set for the first image data that was captured after the photographing instruction,
    the target data size (a) is a compression target data amount set for the second image data that was captured before the photographing instruction, and
    the decision-making unit makes the decision before first image data is recorded on a recording medium.

2. An electronic camera according to claim 1, further comprising:
    a warning unit that issues a warning if the decision-making unit determines that a camera-shake has occurred.

3. An electronic camera according to claim 1, wherein:
    the first image data has a data size larger than a data size of the second image data.

4. An electronic camera according to claim 2, further comprising:
    a recording control unit that records the first compressed image data into the recording medium, wherein:
    the warning unit issues a warning before the recording control unit records the first compressed image data into the recording medium; and
    if a warning has been issued by the warning unit, the recording control unit records the first compressed image data into the recording medium in response to a record instruction issued following the warning.

5. An electronic camera according to claim 4, wherein:
    when recording the first compressed image data in response to the record instruction issued following the warning, the recording control unit records a camera-shake flag into the recording medium in correspondence to the first compressed image data; and
    the electronic camera further comprises a reproduction control unit that indicates a presence of the camera-shake flag recorded in correspondence to the first compressed image data when reproducing an image by using the first compressed image data recorded in the recording medium.

6. An electronic camera according to claim 1, wherein:
    the decision-making unit makes a decision as to whether or not the camera-shake has occurred if a shutter speed set for a photographing operation is lower than a predetermined speed.

7. An electronic camera according to claim 1, further comprising:
    a recording control unit that records the first compressed image data into the recording medium, wherein:
    when the decision-making unit determines that a camera-shake has occurred while obtaining the first image data, the recording control unit records information indicating the occurrence of camera-shake into the recording medium in correspondence to the first compressed image data.

8. An electronic camera according to claim 1, wherein:
    the first image data are photographic image data to be recorded and stored in the recording medium.

9. An electronic camera according to claim 8, wherein:
    the second image data are image data of a through image captured immediately before the first image data are captured.

10. An electronic camera, comprising:
    an image capturing unit that captures a subject image;
    an image compression unit that executes a specific type of compression processing on image data obtained by the image capturing unit;
    a decision-making unit that makes a decision as to whether or not a camera-shake has occurred based upon first compressed image data resulting from the compression processing executed by the image compression unit on first image data obtained by capturing an image following a photographing instruction and second compressed image data resulting from the compression processing executed by the image compression unit on second image data captured prior to the photographing instruction; and
    an image interpolation unit that executes interpolation processing on the second image data so as to substantially match a data size of the second image data with a data size of the first image data, wherein:
    the second compressed image data are obtained by compressing the image data having undergone the interpolation processing; and the decision-making unit determines that a camera-shake has occurred if a data size (d) of the first compressed image data is substantially smaller than a data size (b) of the second compressed image data.

11. An electronic camera according to claim 10, wherein:
a correction coefficient (k) is obtained in advance to match a data size of the second image data with a data size of the first image data; and
the decision-making unit determines that a camera-shake has occurred if a data size (d) of the first compressed image data is smaller than a data size (b×k) of the second compressed image data (b) multiplied by the correction coefficient (k).

* * * * *